Jan. 12, 1926.
Re. 16,249
J. W. GATES
FURNACE ARCH
Original Filed May 11, 1923
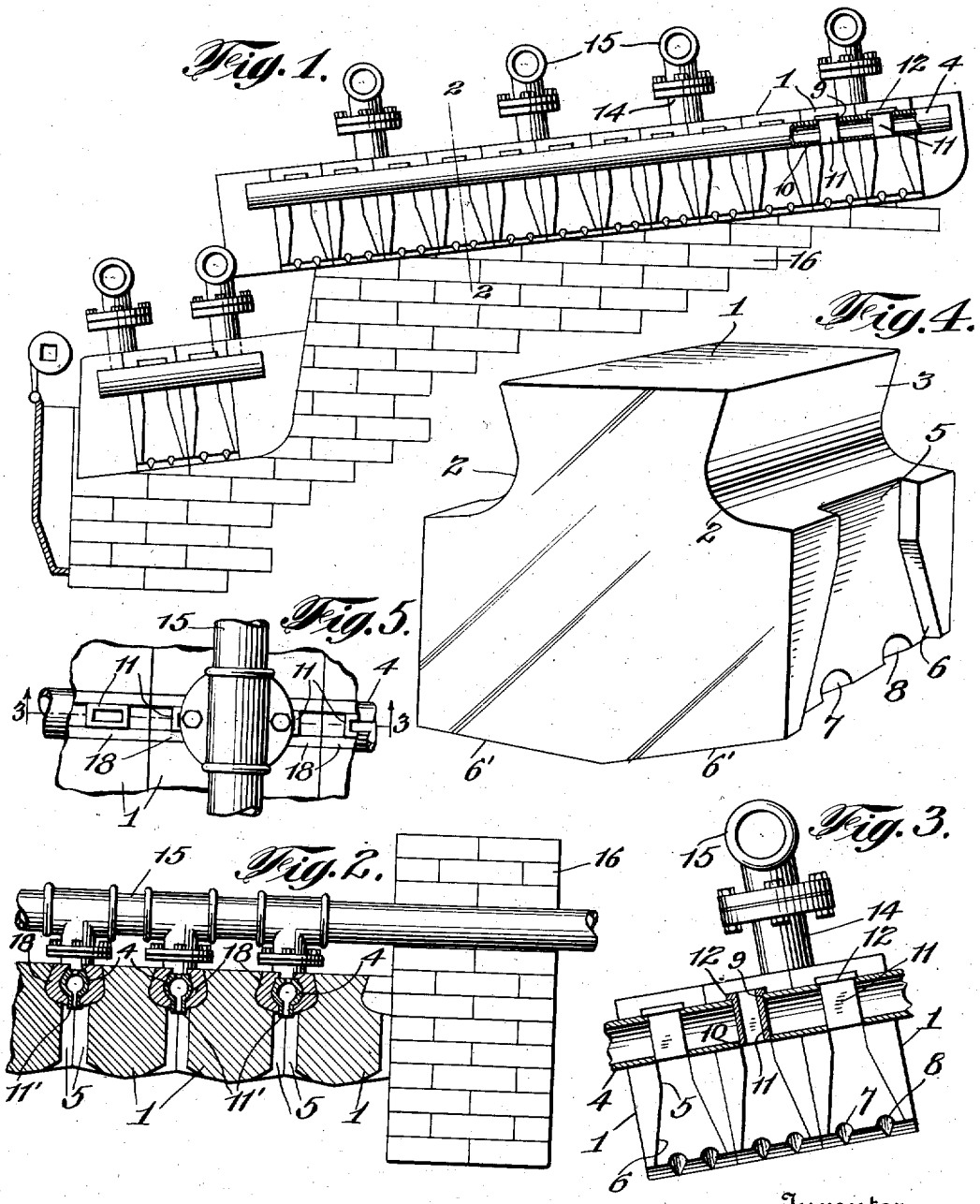
Inventor
John W. Gates,
By his Attorney C. P. Goepel Reissued Jan. 12, 1926. Re. 16,249

UNITED STATES PATENT OFFICE.

JOHN WILLIAM GATES, OF MONTREAL, QUEBEC, CANADA.

FURNACE ARCH.

Original No. 1,500,123, dated July 8, 1924, Serial No. 638,279, filed May 21, 1923. Application for reissue filed July 14, 1925. Serial No. 43,632.

*To all whom it may concern:*

Be it known that I, JOHN WILLIAM GATES, a subject of the King of Great Britain, and residing at the city of Montreal, in the Province of Quebec, in the Dominion of Canada, have invented a new and useful Furnace Arch, of which the following is a specification.

This invention relates to an improved furnace arch, and has for its primary object and purpose to provide an arch structure composed of a plurality of units in the form of bricks or blocks of refractory material which are of such construction as to provide a multiplicity of passages through which air is drawn by the natural draft of the furnace. The purpose of thus supplying the combustion chamber of a furnace with atmospheric air through the arch is two-fold. First, such air as it is drawn through the air passages absorbs heat from the arch bricks and to a certain extent prevents fusing thereof whereby the life of the arch is prolonged, and secondly, the air thus preheated co-mingling with the gases in the combustion chamber below the arch serves to promote combustion and insure complete conversion of the fuel into heat energy, thereby reducing waste and resulting in the efficient and economical operation of the furnace.

It is also an object of my invention to provide a suspending harness for the arch bricks or blocks and means for supplying air through the elements of said harness to the air passages of the arch brick.

It is also an additional object of my present improvements to provide an arch brick or block of improved construction in which each brick is provided in opposite side faces thereof with slots or recesses adapted to mate with each other when the bricks are assembled upon the harness to form the desired air passages through the arch.

With the above and other objects in view, the invention consists in the improved furnace arch and in the form, construction and relative arrangement of the several parts as will be hereinafter more fully described, illustrated in the accompanying drawings, and subsequently incorporated in the subjoined claims.

In the drawings, wherein I have illustrated several simple and practical embodiments of the invention and in which similar reference characters designate corresponding parts throughout the several views,—

Figure 1 is a longitudinal sectional view through the upper portion of the furnace fire box showing my improved arch in position;

Fig. 2 is a transverse sectional view of a portion of the arch taken on the line 2—2 of Fig. 1, but illustrating a slightly modified construction;

Fig. 3 is a fragmentary sectional view on an enlarged scale similar to Fig. 1 of the drawing taken on the line 3—3 of Fig. 5;

Fig. 4 is a detail perspective view of one of the arch brick, and

Fig. 5 is a fragmentary plan view of the construction shown in Fig. 1.

In the drawings I have illustrated my present improvements as applied to a furnace arch structure, but as will hereinafter appear, in so far as the form and construction of the brick or block of which this arch is composed are concerned, such brick or blocks might also be advantageously used as a lining for the vertical walls of the combustion chamber of the furnace.

For purposes of illustration I have selected an embodiment of the invention which has given excellent results in practice, and in which the several wall bricks 1 are molded from refractory material and are provided on one side with longitudinally extending reduced portions thereby forming tube receiving recesses 2 having obliquely inclined side walls 3.

The opposite side faces of the brick are provided with vertically extending recesses or channels 5 communicating at one of their ends with the recesses 2 and gradually widening or flaring to their other ends as indicated at 6. Preferably, the faces of the brick which are exposed to the combustion chamber of the furnace are tapered or inclined inwardly from the opposite sides of the brick to the center thereof as shown at 6′ and in these tapered surfaces of the brick the channels or grooves 7 and 8 leading from the flaring ends 6 of the slots or recesses 5 are formed. Preferably, though not necessarily, these channels or grooves are tapered and at their inner ends merge into the surfaces 6′ of the brick.

The means for mounting or suspending the refractory brick above described in the form of an arch over the upper side of the combustion chamber is quite similar to that disclosed in Patent No. 1,404,845, granted to me on January 31, 1922. Thus, there is provided a series of spaced longitudinally extending tubes 4, each of which is provided at spaced intervals in the upper and lower sides thereof with openings 9 and 10 respectively. As shown in Fig. 1 of the drawings, I may provide thimbles 11 engaged through these openings and having the flanges 12 at their upper ends, or, if desired and preferably, in lieu of the thimbles 11 I may provide each tube with integral nipples 11′ extending downwardly from the openings 10 in the lower side of the tube wall as illustrated in Fig. 2 of the drawings.

The series of tubes 4 are connected with a second series of upper transversely extending air receiving tubes 15, which are mounted in the opposite side walls 16 of the furnace, by suitable couplings 14 through which the air is supplied to the tubes 4. Since there is a free circulation of air through the tubes 15 and 4, the air in the tubes 4 which becomes heated by radiation of heat absorbed by the bricks through the walls of said tubes, is constantly renewed by relatively cool atmospheric air.

The bricks 1 are adapted to be mounted upon the lower tubes 4 in suspended relation therefrom in the manner disclosed in my prior patent above referred to through the medium of the locking wedges 18 which are arranged in the recesses 2 between the inclined walls 3 thereof and the opposite sides of said tubes. Thus, the slots or channels 5 in the side faces of adjacent brick mate with each other and provide vertical air passages in alignment with the thimbles 11 or the nipples 11′.

In the operation of the furnace equipped with my improved arch structure, it will be evident that when the draft supply means for the furnace is opened, suction will be created through the air passages formed by the channels 5 and atmospheric air will be drawn downwardly through said air passages from above the arch wall, or from within the tubes 4 and this atmospheric air will absorb more or less heat radiated from the brick. This extraction of heat from the refractory material prevents fusion thereof and materially lengthens the life of the arch. At the same time the air when it passes through the channels or grooves 7 and 8 to the under side of the arch wall, is in a preheated condition and supplies the unignited gases in the fire box with additional oxygen, thus promoting perfect combustion. In this manner, I have been able to reduce the waste of unconsumed fuel to a minimum and proportionately increase the heating efficiency of the furnace.

It is to be particularly noted that the flared or widened egress ends of the air channels 5 in the brick extend substantially across the entire width of the brick which is exposed to the high temperatures of the combustion chamber of the furnace. Thus the air will be distributed by the channels 7 and 8 more or less uniformly over the exposed surface of the wall. I have found that this construction very greatly reduces the area of the brick which may be fused by the intense heat to which the exposed surface of the wall is subjected so that replacement of the brick will be required only at comparatively long intervals of time.

It will be observed that the area of the air channels or passages 5 through the brick or tile at their ingress ends is appreciably greater than the area of the air supply inlets with which said passages communicate and that the area of said passages gradually enlarges or increases to their egress ends on the exposed face of the arch wall. Thus the draft through the combustion chamber has a more direct induction effect upon the air inlets to said passages and the possibility of said passages being obstructed by the collection of the products of combustion therein and causing back pressure through said passages, impeding or entirely cutting off the inlet of air is obviated. It will thus be seen that the air inlet passages are so distributed and the egress ends of said passages in each row are of such dimensions relative to the intervening exposed surface areas of the wall surface that a substantially co-extensive air film is maintained over said wall surface. The primary object of this air film or blanket is to resist or prevent the deteriorating effects of the intensive heat in the combustion chamber upon the refractory brick or tile composing the arch wall and in practical installations of my present improvements, I have found that the useful life of the arch brick or tile is at least three times that which is possessed by such arch structures as heretofore employed in this art.

A secondary, but nevertheless, important advantage obtained by means of the construction herein described resides in the additional oxygen which the air film or blanket over the inner face of the arch wall supplies to the products of combustion. As a result thereof, the collection of soot upon the combustion chamber walls caused by unburned products is practically negligible. Owing to the fact that the air film is substantially co-extensive in area with the surface of the arch wall, this additional supply of oxygen is practically uniform over the entire area of the combustion chamber and is constantly being replenished by the streams of air entering through the arch passages 5.

From the foregoing description considered in connection with the accompanying drawings, the construction, manner of operation and several advantages of my present improvements will be fully and clearly understood. It will be seen that I have devised an improved form and construction of the refractory brick for use in furnace arches or walls whereby there is secured not only a longer use or life of the arch or the wall structure, thus reducing the maintenance cost, but also enabling the furnace to be operated at higher efficiency and without necessitating the great amount of manual labor heretofore required in the proper operation of industrial furnaces.

While I have herein shown and described several practical embodiments of my present improvements, it is nevertheless to be understood that the essential features thereof might also be exemplified in various other alternative structures, and I accordingly reserve the privilege of resorting to all such legitimate changes in the form, construction and relative arrangement of the several parts as may be fairly embodied within the spirit and scope of the invention as claimed.

I claim:

1. In a furnace suspended arch construction, a supporting harness including spaced elements mounted in the furnace structure and provided with air passages therethrough open to the atmosphere at one of their ends, and an arch composed of blocks suspended from said elements and having air passages spaced longitudinally of the depth of the furnace registering with the other ends of the air passages through said harness elements and opening upon the under side of the arch, the egress ends of said passages longitudinally thereof being of greater length than the distance between the egress ends of adjacent passages.

2. In a furnace suspended arch construction, rows of blocks, each block having vertical channels in its opposite side faces mating with similar channels in the opposed blocks of adjacent rows, and air supply means for said channels consisting of spaced parallel elements from which said blocks are suspended, and each of said elements having spaced air delivery orifices registering with the respective mating channels of adjacent block rows and said orifices being of less area than the combined areas of the ingress ends of said mating channels and said channels gradually increasing in area to their egress ends opening upon the exposed surface of the arch wall.

3. In a furnace suspended arch construction, a supporting harness including a plurality of spaced elements mounted in the furnace structure and each of said elements provided with spaced means for supplying air therethrough, and an arch structure comprising rows of blocks arranged between said spaced harness elements and removably interlocked therewith, the opposed faces of the blocks in adjacent rows being recessed to provide rectangular air receiving passages of greater width than depth opening upon the under side of the arch and communicating respectively with the spaced air supply means of said harness elements, the egress ends of the passages in adjacent rows of blocks extending longitudinally of the depth of the furnace and, in the aggregate, extending the major portion of the depth of the blocks.

4. In a furnace suspended arch construction, transverse main air tubes suitably supported in the furnace structure, longitudinal subsidiary tubes supported from said main tubes and having enclosed passages therethrough open to the atmosphere, and an arch structure comprising rows of blocks joined to said subsidiary tubes and supported thereby and having passages therethrough registering with the passages of said subsidiary tubes.

5. In furnace suspended arch construction, a plurality of spaced hanger elements extending longitudinally of the depth of the furnace above the combustion chamber of the furnace and each provided with a series of spaced air delivery orifices, an arch structure comprising a plurality of rows of blocks suspended from said hanger elements, each block having air passages in its opposite side faces mating with similar passages in the adjacent blocks of the same rows, and said mating passages at their ingress ends directly communicating respectively with said spaced orifices of the hanger elements and said mating passages gradually increasing in horizontal cross-sectional area from their ingress ends to their egress ends opening upon the exposed face of the arch, and each of the blocks on its egress end face being provided with means for facilitating the distribution of the incoming air transversely over the surface of the arch wall.

6. In furnaces suspended arch construction, a plurality of spaced tubes mounted in the furnace structure and supplied with external atmospheric air, each of said tubes having spaced means through which the air is adapted to be drawn by the natural draft of the furnace, and an arch structure comprising rows of blocks suspended from said tubes and provided with air passages communicating at one of their ends with the combustion chamber of the furnace and registering at their other ends with the spaced air supply means of the tubes, the area of said passages at their latter ends appreciably exceeding the area of the air supply inlet of the tubes and said passage area of the blocks gradually increasing from the ingress to the egress end thereof.

7. In furnace suspended arch construction, transverse main air tubes supported in the furnace structure, longitudinal subsidiary air tubes supported by and under said main tubes and communicating therewith, and an arch structure comprising rows of blocks suspended from said subsidiary tubes, the blocks in adjacent rows having vertical channels in their opposed faces mating with each other to provide air passages, said subsidiary tubes having spaced means with which said air passages of the blocks communicate at one of their ends and through which the air is drawn by the natural draft of the furnace, and the bottom faces of said blocks at the other ends of said air passages having spaced channels therein for facilitating the distribution of the air over the under side of the arch blocks.

8. A block for a furnace combustion chamber having a part provided in a side face thereof with a longitudinally extending channel to receive a supporting member and having an exposed face adapted to be opposed to the combustion chamber inclined in a direction at right angles to said channel, said block in said side face thereof being provided with a vertical air receiving passage having an upper portion of uniform horizontal cross-sectional area communicating with the lower side of said channel, and a lower portion gradually increasing in width and having an egress end opening upon said inclined face, and said inclined face of the block having an air distributing channel therein communicating at one end with the egress end of said passage and gradually decreasing in depth to its other end.

9. A furnace arch wall structure composed of rows of blocks of refractory material, said blocks having air passages extending therethrough and equi-distantly spaced from each other longitudinally of the depth of the furnace, the egress ends of said air passages opening upon the under side of the arch wall, and said egress end of each air passage longitudinally of the depth of the furnace exceeding the linear longitudinal extent of the wall surface of the depth of the furnace intervening between the egress ends of the adjacent passages, and means for supplying atmospheric air to the other ends of said passages.

10. A block for a furnace combustion chamber having a portion shaped along opposite sides thereof to be positioned between and connected with spaced supports and provided with a surface to be opposed to the combustion chamber inclined in opposite directions from said opposite sides of the block, each of said opposed sides of the block being further provided with a vertically extending air receiving passage having an ingress end of relatively small area, an end portion of substantially uniform width, and a second portion constituting a continuation of said first portion and having an egress end of relatively great width opening upon one of the inclined surfaces of the block, and each of said inclined surfaces of the block having an air distributing channel therein communicating at one of its ends with the egress end of one of said air passages and extending transversely therefrom along said inclined surface towards the center of the block.

11. A refractory block for a furnace combustion chamber having opposite side faces provided with channels therein through which air is adapted to be drawn by the draft of the furnace, said channels at their egress ends extending substantially across the entire width of the face of the block which forms the exposed wall surface of the combustion chamber, and said block in the exposed face thereof having a plurality of air distributing channels each directly communicating with the egress ends of said first named channels.

12. In a furnace suspended arch construction, a supporting harness including a plurality of spaced elements mounted in the furnace structure and each of said elements provided with spaced means for supplying air therethrough, and an arch structure comprising rows of blocks arranged between said spaced harness elements and removably interlocked therewith, the opposed faces of the blocks in adjacent rows being recessed to provide rectangular air receiving passages of greater width than depth opening upon the under side of the arch and communicating respectively with the spaced air supply means of said harness elements, the egress ends of the passages in adjacent rows of blocks extending longitudinally of the depth of the furnace and, in the aggregate, exceeding the major portion of the depth of the blocks, and means interposed between the blocks and spaced elements permitting the individual removal and displacement of the blocks vertically with respect to the face of the arch, by the removal and replacement of said means.

In testimony that I claim the foregoing as my invention, I have signed my name hereto.

JOHN WILLIAM GATES.